(12) United States Patent
Chorn et al.

(10) Patent No.: US 10,386,538 B2
(45) Date of Patent: Aug. 20, 2019

(54) SYSTEMS AND METHODS FOR IDENTIFYING GEOLOGICAL CORE AREAS

(71) Applicant: Landmark Graphics Corporation, Houston, TX (US)

(72) Inventors: Larry Gregg Chorn, Houston, TX (US); Jeffrey M Yarus, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 578 days.

(21) Appl. No.: 14/778,843

(22) PCT Filed: Jun. 20, 2013

(86) PCT No.: PCT/US2013/046825
§ 371 (c)(1),
(2) Date: Sep. 21, 2015

(87) PCT Pub. No.: WO2014/204467
PCT Pub. Date: Dec. 24, 2014

(65) Prior Publication Data
US 2016/0047942 A1 Feb. 18, 2016

(51) Int. Cl.
*G01V 99/00* (2009.01)

(52) U.S. Cl.
CPC ...... *G01V 99/005* (2013.01); *G01V 2210/663* (2013.01); *G01V 2210/665* (2013.01); *G01V 2210/667* (2013.01)

(58) Field of Classification Search
CPC ...... G01V 1/282; G01V 1/345; G01V 99/005; G01V 2210/123; G01V 2210/679; G01V 11/00; G01V 1/28; G01V 1/34; G01V 1/364; G01V 1/38; G01V 1/40; G01V 3/20; G01V 3/38; G01V 1/181; G01V 1/306

See application file for complete search history.

(56) References Cited

U.S. PATENT DOCUMENTS

| | | | |
|---|---|---|---|
| 2003/0112235 A1* | 6/2003 | Grace | G06T 17/20 345/419 |
| 2006/0052938 A1 | 3/2006 | Thorne et al. | |
| 2008/0162093 A1 | 7/2008 | Nivlet et al. | |
| 2010/0036614 A1* | 2/2010 | Zuercher | G01V 1/288 702/16 |
| 2010/0326651 A1* | 12/2010 | Pietrobon | E21B 43/14 166/250.01 |
| 2011/0120702 A1 | 5/2011 | Craig | |

(Continued)

FOREIGN PATENT DOCUMENTS

WO 20100149917 A1 6/2014

OTHER PUBLICATIONS

McGowen, Robert M., Valuing Oil Gas properties, 2000, 39th Annual of the Arkansas Natural Resources Law Institute (Year: 2000).*

(Continued)

*Primary Examiner* — Roy Y Yi
(74) *Attorney, Agent, or Firm* — Polsinelli PC (57) ABSTRACT

Systems and methods for identifying geological core areas by using one or more rock property metrics to construct a cumulative probability distribution and variance of the rock property metrics that may be used for ranking and identifying the geological core areas.

20 Claims, 5 Drawing Sheets

(56) References Cited

U.S. PATENT DOCUMENTS

2011/0295510 A1* 12/2011 Gulati ................. G01V 1/28
                                                    702/16
2012/0323495 A1    12/2012 Zhou et al.
2013/0124171 A1     5/2013 Schuette et al.
2013/0179080 A1*  7/2013 Skalinski ............. G01V 99/00
                                                    702/7

OTHER PUBLICATIONS

International Search Report and Written Opinion; PCT Application No. PCT/US2013/46825; dated Dec. 20, 2013.
Pitcher et al., "Exploring Shale Basins using Existing Wells", Society of Petroleum Engineers 2012, SPE 152579, pp. 1-8.

* cited by examiner

SYSTEMS AND METHODS FOR IDENTIFYING GEOLOGICAL CORE AREAS

CROSS-REFERENCE TO RELATED APPLICATIONS

This application claims the priority of PCT Patent Application No. PCT/US13/46825, filed on Jun. 20, 2013, which is incorporated herein by reference.

STATEMENT REGARDING FEDERALLY SPONSORED RESEARCH

Not applicable.

FIELD OF THE INVENTION

The present invention generally relates to systems and methods for identifying geological core areas. More particularly, the present invention relates to identifying geological core areas by using one or more rock property metrics to construct a cumulative probability distribution and variance of the rock property metrics that may be used for ranking and identifying the geological core areas.

BACKGROUND OF THE INVENTION

Current practice for determining new well locations in shale plays is to drill near a good production well. There is widespread recognition that key shale properties influence production rates and the recovery of hydrocarbon volumes for the well, but there are no known applications of these properties and their variances over area and depth to guide well placement. Operators therefore, use the production history of existing wells to build a regional production quality map of existing wells. The production history of existing wells requires 6 months to establish the quality of the shale properties and the advisability of making a subsequent investment in the nearby acreage, which degrades the efficiency of "factory" drilling programs. Evidence that offset wells near a production well do not always replicate the initial well's production performance exists for every U.S. shale play. As a consequence, forecasting drilling results based on the production history of existing wells is not reliable and many disappointing wells are drilled.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

The present invention therefore, overcomes one or more deficiencies in the prior art by providing systems and methods for identifying geological core areas by using one or more rock property metrics to construct a cumulative probability distribution and variance of the rock property metrics that may be used for ranking and identifying the geological core areas.

In one embodiment, the present invention includes a method for identifying geological core areas, which comprises: i) normalizing rock property values over a range of estimated rock property values; ii) computing a rock property metric for each cell in a study area using the normalized rock property values; iii) computing a probability map of the rock property metric(s); iv) correlating each permitted well in the study area with the probability map; v) computing a probability distribution and variance of the rock property metric(s) within each leasehold in the study area; and vi) ranking each leasehold using a computer processor according to its assigned category of cumulative probability distribution and variance.

In another embodiment, the present invention includes a non-transitory program carrier device tangibly carrying computer executable instructions for identifying geological core areas, the instructions being executable to implement: i) normalizing rock property values over a range of estimated rock property values; ii) computing a rock property metric for each cell in a study area using the normalized rock property values; iii) computing a probability map of the rock property metric(s); iv) correlating each permitted well in the study area with the probability map; v) computing a probability distribution and variance of the rock property metric(s) within each leasehold in the study area; and vi) ranking each leasehold according to its assigned category of cumulative probability distribution and variance.

In yet another embodiment, the present invention includes a non-transitory program carrier device tangibly carrying computer executable instructions for identifying geological core areas, the instructions being executable to implement: i) normalizing core property values over a range of estimated rock property values; ii) computing a rock property metric for each cell in a cell in a study area using the normalized rock property values; ii) computing a probability map of the rock property metric(s); iv) correlating each permitted well in the study area with the probability map; v) computing a probability distribution and variance of the rock property metric(s) within each leasehold in the study area; vi) ranking each leasehold according to its assigned category of cumulative probability distribution and variances; and vii) planning a drilling program for the study area based on the rank of each leasehold, a location of each permitted well and an anticipated production performance associated with each ranked leasehold.

The subject matter of the present invention is described with specificity, however, the description itself is not intended to limit the scope of the invention; The subject matter thus, might also be embodied in other ways, to include different steps or combinations of steps similar to the ones described herein, in conjunction with other technologies. Moreover, although the term "step" may be used herein to describe different elements of methods enlployed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied in other industries, such as mining, geothermal, disposal wells (water, CO2, etc.) and construction to achieve similar results.

Method Description

Figure 1:
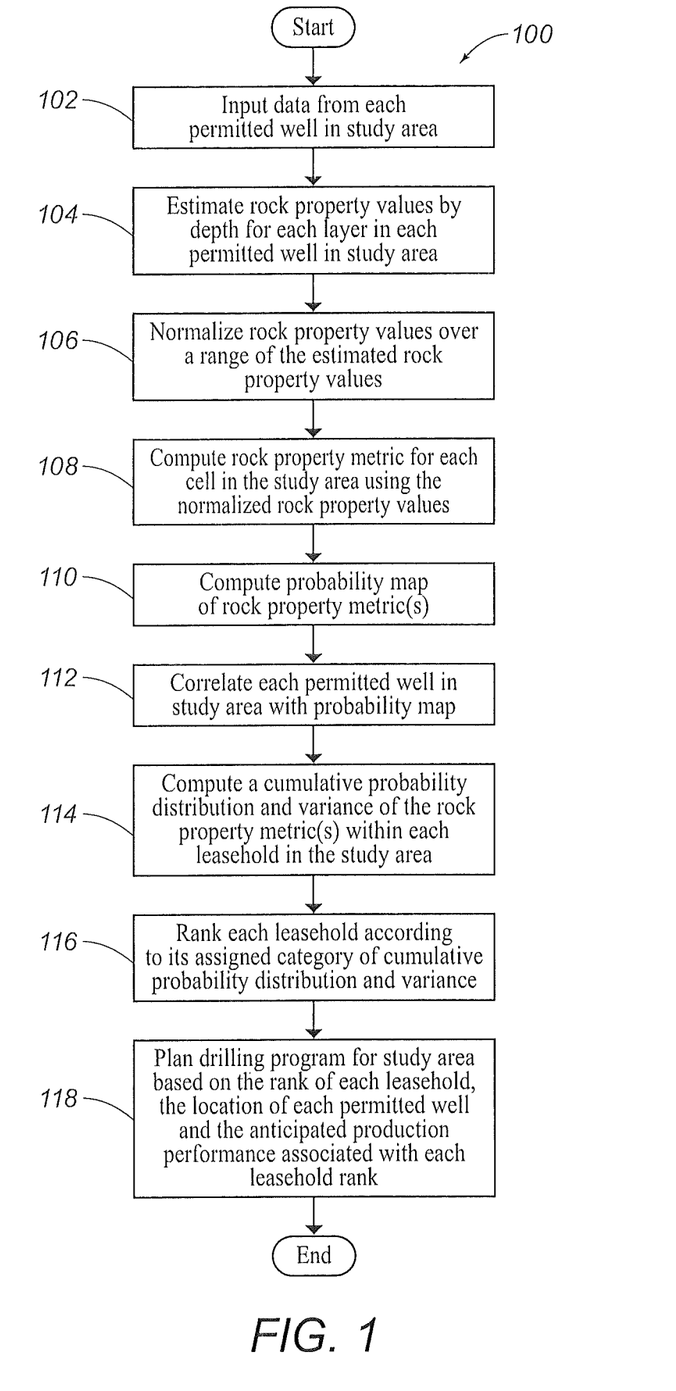
FIG. 1 is a flow diagram illustrating one embodiment of a method for implementing the present invention.

Referring now to FIG. 1, a flow diagram of one embodiment of a method 100 for implementing the present invention is illustrated.

Figure 8:
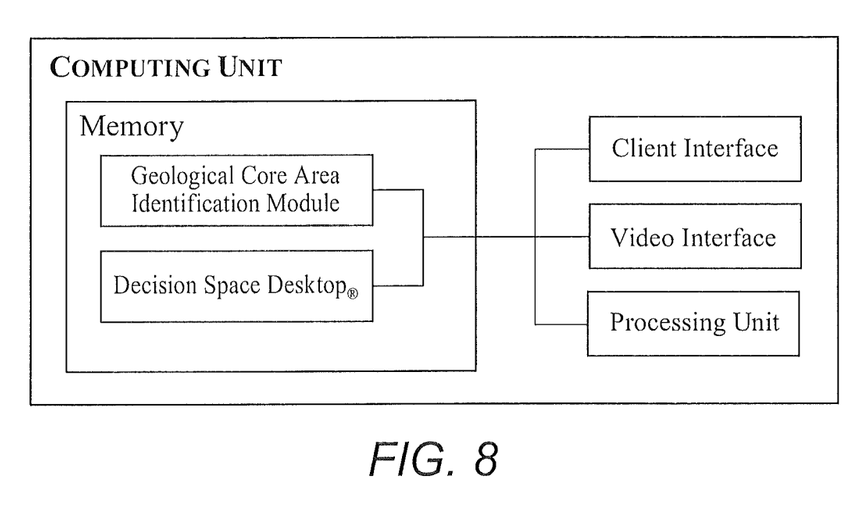
FIG. 8 is block diagram illustrating one embodiment of a computer system for implementing the present invention.

In step 102, data is input from each permitted well within a study area of the operator's mineral leasehold using the client interface and/or the video interface described further in reference to FIG. 8. The data may include, for example: i) data acquired from electronic well logs, cores or cuttings, well surveys, perforation depths, fracture program designs and production history; ii) data acquired from core analysis by depth (e.g. porosity, TOC, vitrinite reflectance, permeability, mineral analysis, and Poisson ratio measurements); iii) data acquired from a production history analysis (e.g. production allocation by geologic layer (depth) and amount of hydraulic fracture stimulation); iv) initial production rate and estimated ultimate recovery (EUR) from decline curve analysis; and v) perforations and well trajectories within the study area by latitude and longitude from well surveys.

Figure 2:
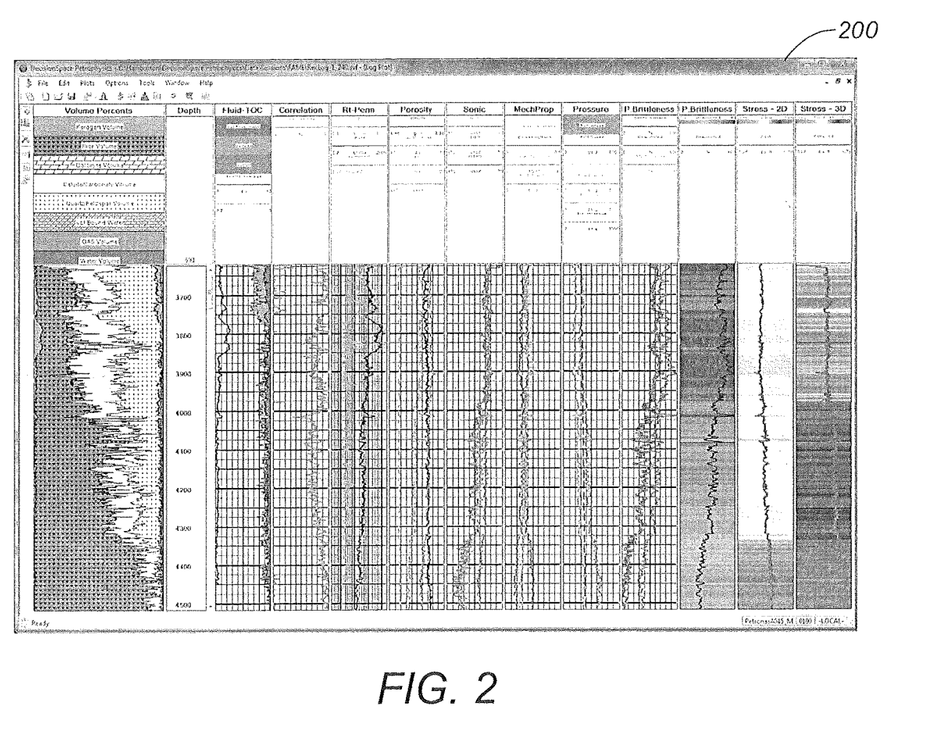
FIG. 2 is an exemplary well log illustrating the results of step 104 in FIG. 1.

In step 104, rock property values are estimated by depth for each layer in each permitted well in the study area using techniques well known in the art for analyzing the electronic well log data input in step 102. Such techniques may include, for example, well log analysis to estimate values for rock properties such as hydrocarbon saturations, TOC, net pay thickness, brittleness and porosity by depth for each layer in each permitted well. The electronic well log data may be calibrated using the core analysis data input in step 102 and each permitted well may be accurately located using the well survey data input in step 102. FIG. 2 is an exemplary well log 200 illustrating the results of this step.

In step 106, the rock property values (e.g. TOC, porosity, net pay thickness, hydrocarbon saturations, brittleness) estimated in step 104 are normalized over a range of the estimated rock property values using techniques well known in the art for normalization. The result is a rock property value indicative of quality wherein the quality implies a potential for high production.

In step 108, a rock property metric is computed for each cell in the study area using the normalized rock property values from step 106 and well known, standard multivariate and geostatistical techniques. Cells are volumes of rock with small dimensions (100 feet wide×100 feet long×10 feet thick such as, for example, shale). The more cells in a study area the more accurate the representation of the variation of the rock property values.

Figure 3:
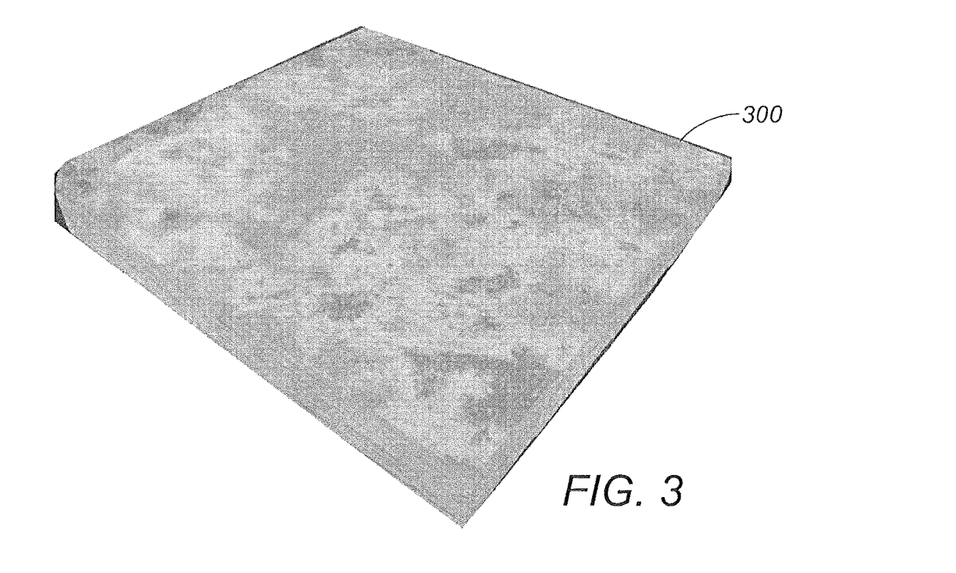
FIG. 3 is an exemplary probability map illustrating the results of step 110 in FIG. 1.

In step 110, a probability map of the rock property metric(s) computed in step 108 is computed using well known geostatistical tools. The probability map preferably includes a high granularity (small cell volume, (order of 0.0004 miles$^2$×10 feet thickness) of the rock property metric(s) for each permitted well in the study area. FIG. 3 is an exemplary probability map 300 illustrating the results of this step.

In step 112, each permitted well within the study area of the operator's mineral leasehold is correlated with the probability map computed in step 110 by overlaying a map of the study area of the operator's mineral leasehold on the probability map. The perforations and well trajectories from the well survey data input in step 102 may be used to confirm the production zones that contribute to the production history. In this planner, the anticipated production performance may be indicated.

Figure 4:
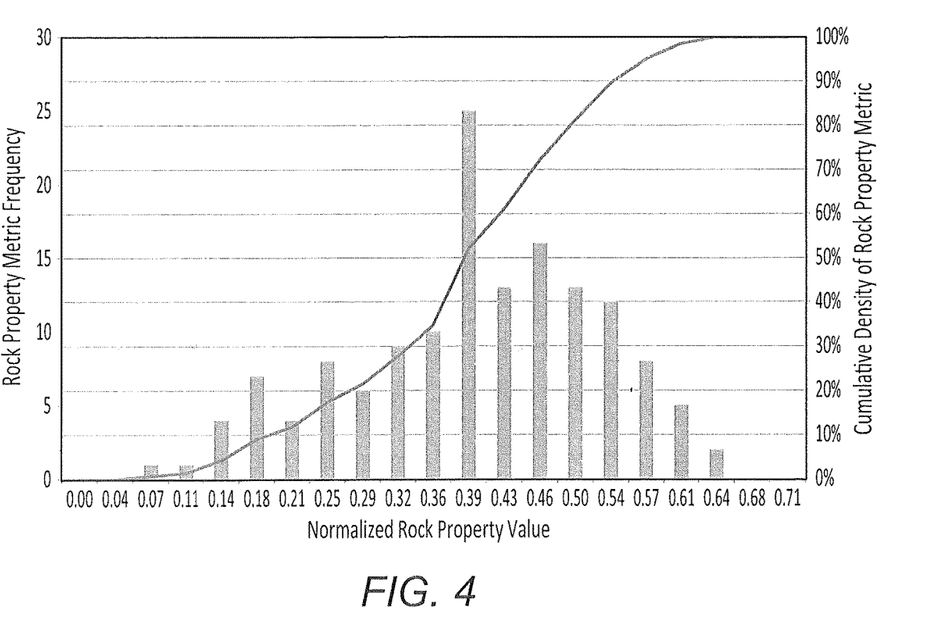
FIG. 4 is an exemplary graph illustrating the results of step 114 in FIG. 1.

In step 114, a cumulative probability distribution and variance of the rock property metric(s) computed in step 108 are computed within each leasehold in the study area using statistical techniques well known in the art. For example, the mean and variance of the rock property metric(s) in a rock volume may be computed by cell location within each leasehold. The variance for each leasehold represents the relative probability of low production or "relative risk." The cumulative probability distribution is then computed using the computed means. Optimally, the cumulative probability distribution is divided into categories for each leasehold, which represent the relative probability of high production or "relative reward," such as, for example, $P_{10}$, $P_{20}$, etc. Each leasehold therefore, is assigned a category for ranking purposes in a drilling order. Depending on its size, a leasehold may have one or several permitted drilling locations (e.g. wells). All permitted drilling locations within the leasehold are ranked the same. FIG. 4 is an exemplary graph 400 illustrating the results of this step.

Figure 5:
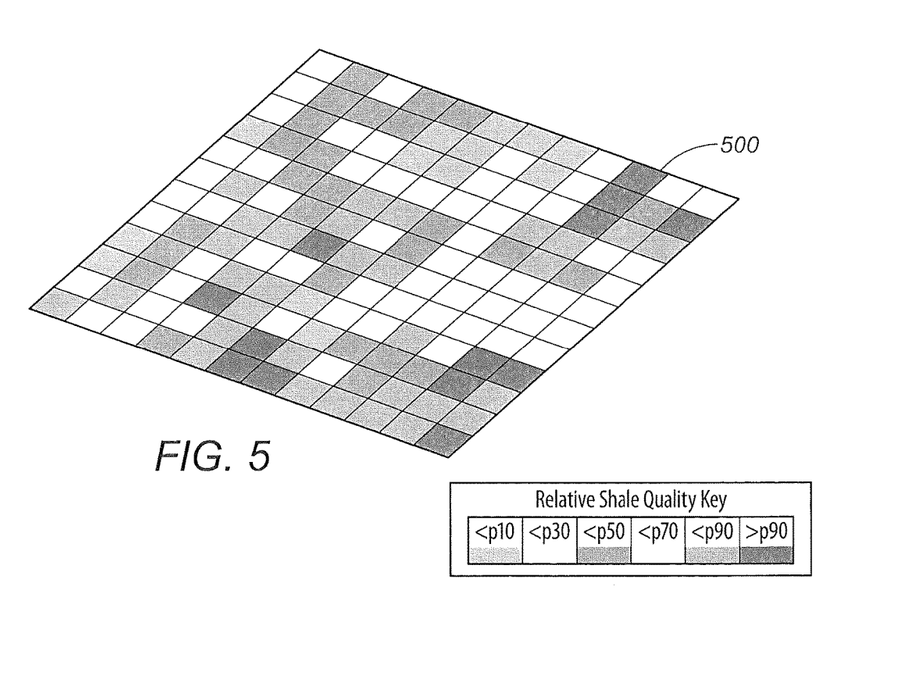
FIG. 5 is an exemplary display illustrating the relative shale quality for each leasehold ranked in step 116 of FIG. 1.
Figure 6:
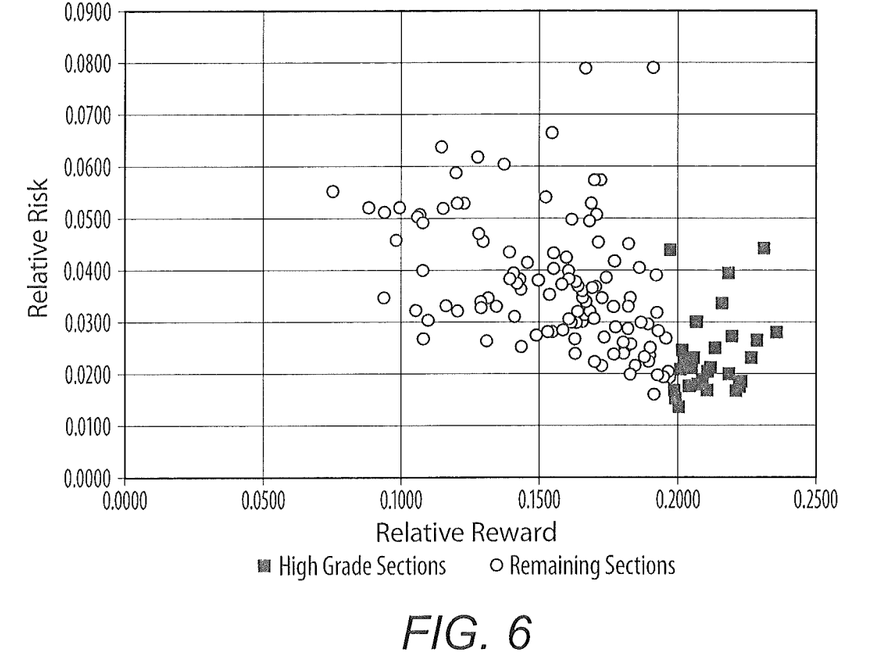
FIG. 6 is an exemplary graph illustrating the results of step 116 in FIG. 1.

In step 116, each leasehold is ranked according to its assigned category of cumulative probability distribution and variance. In this manner, the leaseholds that are assigned the highest $P_{90}$ category and the lowest variance are given the highest rank in the drilling order because they have the highest likelihood within the study area for high production potential. Conversely, the leaseholds that are assigned the lowest $P_{10}$ category and the highest variance are given the lowest rank in the drilling order because they have the lowest likelihood within the study area for high production potential. The production history analysis, initial production rate and estimated ultimate recovery (EUR) from the data input in step 102 may be used to calibrate (validate) the ranked results. FIG. 5 is an exemplary display 500 illustrating the relative shale quality according to its assigned category of cumulative probability distribution (relative reward) for each leasehold. FIG. 6 is an exemplary graph 600 illustrating the relative risk and relative reward for each ranked leasehold.

Figure 7:
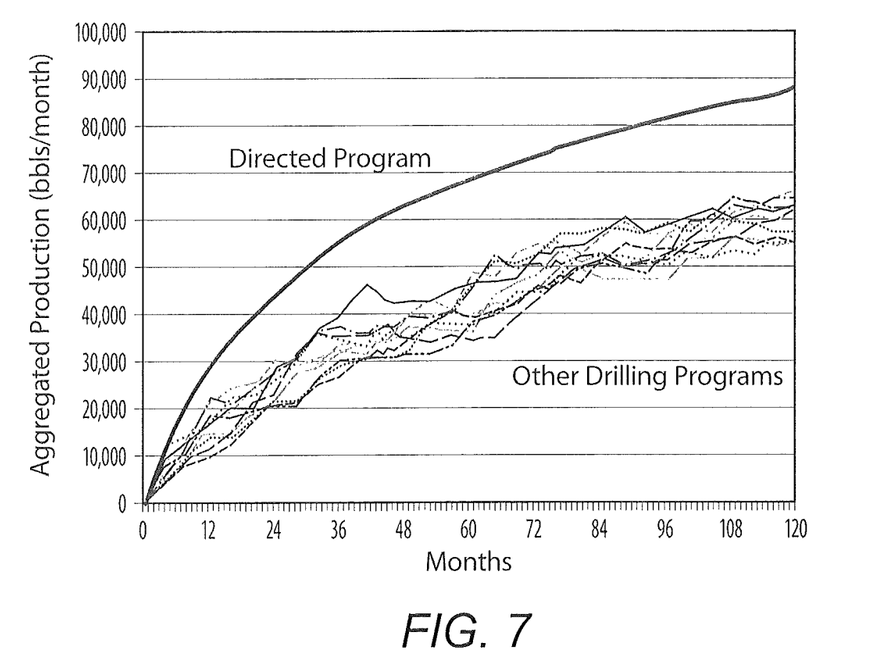
FIG. 7 is an exemplary graph illustrating the results of step 118 in FIG. 1.

In step 118, a drilling program is planned for the study area based on the rank of each leasehold from step 116, the location of each permitted well in the study area and the anticipated production performance associated with a leasehold rank indicated in step 112. The drilling program will preferably target the highest potential production leaseholds with the lowest risk. Optionally, surface feature metrics, production facility limitations and ease of permitting parameters may be considered to re-order the drilling program. FIG. 7 is an exemplary graph 700 illustrating a planned drilling program (directed program) according to the method 100 compared to other, less desirable, drilling programs using other means for planning. A test case of the method 100 indicated that about 30 percent of a particular shale play area could be considered a high production core area. The method 100 is scalable in area and thickness and can be used to in any shale play area where there are cored, logged wells with more than one month of production history. The method 100 can be used in any shale play area because the computed rock (shale) property metrics are relative to the area under consideration. The method 100 can be used to compare shale play areas and regions of shale play areas as well. The method 100 requires, at a maximum, less than one well per two square miles of a shale play area, for example, to calibrate. Better drilling programs therefore, may be planned with higher confidence. Areas within an expansive shale play can quickly be high-graded for optimizing field development drilling or as an input to an economic valuation for transactions as demonstrated by one or more of the following examples.

Example 1

Mineral rights in shale play areas are regularly bought and sold. Historically, when there are no wells in the area, lease bonuses or purchase prices are uncertain. As more wells are drilled and production histories established, valuations can be set and mineral rights trade at a market-based price. Not all shale is high quality and shale properties vary over tens of feet laterally and over a few feet vertically. As a consequence, some leases are good and some are bad but this is not known until the lease is acquired and a well drilled. Existing technology can only indicate, generally, whether a shale play area will be productive. A quantitative measure of shale quality based on well logs and production histories connects shale geology directly to well performance and to undrilled property values.

Example 2

Areas in a shale play have different production potential due to variations in shale property quality. Investment programs in shale play areas are large due the need to drill 10 to 100 times as many wells in shale as in a conventional accumulation to produce the mobile hydrocarbon. Avoiding areas with poor shale quality saves investment capital and accelerates the overall development of the play. The present invention provides a quantitative measure of relative shale property quality, which allows the operator to focus capital investments on areas with high probability of good production. Companies with limited capital therefore, can allocate dollars to wells that have the best probability of high investment returns.

Example 3

Large drilling programs during shale play area development require extensive planning. Management requires confidence in return on investment, predictable production profiles and reserves recognition. The probabilistic representation of shale property quality in three-dimensional volumes allows corporate planners to select drilling locations that will deliver metrics that match corporate business needs. The present invention thus, quantifies the reward and risks of each drilling location for use in a traditional portfolio analysis tool to allocate capital.

Example 4

Banks and hedge funds require collateral for lending on drilling programs. Various approaches are used to estimate expected ultimate recovery and cash flows from shale play area wells. These approaches are known to be limited in their ability to forecast in undrilled areas and, to a degree, even for offset wells. As a consequence the amount that can be lent is reduced, loan covenants are overly restrictive or the interest rate is much higher than if there were reliable forecasting methodologies. The present invention thus, can be used by operators to quantify the value of their shale play area leaseholds much more accurately and assist in securing debt capital for field development programs.

System Description

The present invention may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace® Desktop, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g., various types of RAM or ROM). Furthermore, the software and its results may be transmitted over a variety of carrier media such as optical fiber, metallic wire, and/or through any of a variety of networks, such as the Internet.

Moreover, those skilled in the art will appreciate that the invention may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 8, a block diagram illustrates one embodiment of a system for implementing the present invention on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 1-7. The memory therefore, includes a geological core area identification module, which enables the methods described in reference to steps 106, 110, 112, 114, 116 and 118 in FIG. 1. The geological core area identification module may integrate functionality from the remaining application programs illustrated in FIG. 8. In particular, DecisionSpace® Desktop may be used as an interface application to perform steps 102, 104 and 108 in FIG. 1 and includes other modules that may be used to process the well logs in step 104. Although DecisionSpace Desktop may be used as an interface application, other interface applications may be used, instead, or the geological core area identification module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from Or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse; trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for identifying geological core areas, which comprises:
    normalizing, by a processor, rock property values over a range of estimated rock property values;
    computing, by the processor, a rock property metric for each cell in a study area using the normalized rock property values;
    computing, by the processor, a probability map of the rock property metric(s);
    correlating, by the processor, each permitted well in the study area with the probability map;
    computing, by the processor, a probability distribution and variance of the rock property metric(s) within;
    determining, by the processor, an anticipated production performance including a quantitative measure of the rock property metric(s) for each leasehold in the study area;
    assigning, by the processor, each leasehold a category based on the quantitative measure relative to other leaseholds;
    ranking, by the processor, each leasehold using a computer processor according to its assigned category; and
    producing, by the processor, a visualization of the study area which displays the ranking of each leasehold.

2. The method of claim 1, further comprising planning, by the processor, a drilling program for the study area based on the rank of each leasehold, a location of each permitted well and the anticipated production performance associated with each ranked leasehold.

3. The method of claim 1, wherein the anticipated production performance is indicated by the correlation of each permitted well in the study area with the probability map.

4. The method of claim 1, wherein the range of estimated rock property values is estimated by a depth for each layer in each permitted well in the study area.

5. The method of claim 4, wherein each rock property value is indicative of a quality representing a potential for production above a desired threshold.

6. The method of claim 1, wherein each cell represents a volume of rock.

7. The method of claim 6, wherein the rock is shale with dimensions of 100 feet wide, 100 feet long and 10 feet thick.

8. The method of claim 1, wherein each leasehold assigned a highest category of cumulative probability distribution and a lowest variance is ranked highest in a drilling order and each leasehold assigned a lowest category of cumulative probability distribution and a highest variance is ranked lowest in the drilling order.

9. A non-transitory program carrier device tangibly carrying computer executable instructions for identifying geological core areas, the instructions being executable to implement:
    normalizing rock property values over a range of estimated rock property values;
    computing a rock property metric for each cell in a study area using the normalized rock property values;
    computing a probability map of the rock property metric(s);
    correlating each permitted well in the study area with the probability map;

computing a probability distribution and variance of the rock property metric(s) within each leasehold in the study area;

determining an anticipated production performance including a quantitative measure of the rock property metric(s) for each leasehold in the study area;

assigning each leasehold a category based on the quantitative measure relative to other leaseholds;

ranking each leasehold according to its assigned category; and producing a visualization of the study area which displays the ranking of each leasehold.

10. The program carrier device of claim 9, further comprising planning a drilling program for the study area based on the rank of each leasehold, a location of each permitted well and the anticipated production performance associated with each ranked leasehold.

11. The program carrier device of claim 9 wherein the anticipated production performance is indicated by the correlation of each permitted well in the study area with the probability map.

12. The program carrier device of claim 9, wherein the range of estimated rock property values is estimated by a depth for each layer in each permitted well in the study area.

13. The program carrier device of claim 12, wherein each rock property value is indicative of a quality representing a potential for production above a desired threshold.

14. The program carrier device of claim 9, wherein each cell represents a volume of rock.

15. The program carrier device of claim 14, wherein the rock is shale with dimensions of 100 feet wide, 100 feet long and 10 feet thick.

16. The program carrier device of claim 9, wherein each leasehold assigned a highest category of cumulative probability distribution and a lowest variance is ranked highest in a drilling order and each leasehold assigned a lowest category of cumulative probability distribution and a highest variance is ranked lowest in the drilling order.

17. A non-transitory program carrier device tangibly carrying computer executable instructions for identifying geological core areas, the instructions being executable to implement:

normalizing rock property values over a range of estimated rock property values;

computing a rock property metric for each cell in a study area using the normalized rock property values;

computing a probability map of the rock property metric(s);

correlating each permitted well in the study area with the probability map;

computing a probability distribution and variance of the rock property metric(s) within each leasehold in the study area;

determining an anticipated production performance including a quantitative measure of the rock property metric(s) for each leasehold in the study area;

assigning each leasehold a category based on the quantitative measure relative to other leaseholds;

ranking each leasehold according to its assigned category;

producing a visualization of the study area which displays the ranking of each leasehold; and planning a drilling program for the study area based on the rank of each leasehold, a location of each permitted well and the anticipated production performance associated with each ranked leasehold.

18. The program carrier device of claim 17, wherein the anticipated production performance is indicated by the correlation of each permitted well in the study area with the probability map.

19. The program carrier device of claim 17, wherein the range of estimated rock property values is estimated by a depth for each layer in each permitted well in the study area.

20. The program carrier device of claim 19, wherein each rock property value is indicative of a quality representing a potential for production above a desired threshold.

* * * * *